United States Patent [19]

Fritsch

[11] Patent Number: 4,859,216
[45] Date of Patent: Aug. 22, 1989

[54] PROCESS AND EQUIPMENT FOR THE TREATMENT AND RECOVERY OF SOLVENT VAPORS BY RECYCLING ON ACTIVE CHARCOAL

[75] Inventor: Georges Fritsch, Paris, France

[73] Assignees: Ameg France, Paris; Ceca S.A., Courbevoie, both of France

[21] Appl. No.: 173,634

[22] Filed: Mar. 25, 1988

[30] Foreign Application Priority Data

Mar. 27, 1987 [FR] France ................. 87 04337

[51] Int. Cl.$^4$ ............................................. B01D 53/04
[52] U.S. Cl. ............................................ 55/28; 55/62; 55/74; 55/82; 55/180; 55/208; 55/269; 55/350; 55/387; 55/528
[58] Field of Search ............... 55/18, 28, 59–62, 55/74, 161, 179, 208, 270, 274, 350, 387, 512, 528, 82, 267–269

[56] References Cited

U.S. PATENT DOCUMENTS

| | | | |
|---|---|---|---|
| 995,513 | 6/1911 | Würth | 55/179 |
| 1,521,576 | 12/1924 | Wittemeier | 55/350 |
| 1,771,846 | 7/1930 | Goodloe | 55/350 X |
| 1,831,782 | 11/1931 | Strindberg | 55/350 X |
| 1,895,618 | 1/1933 | Fedeler | 55/350 X |
| 1,943,617 | 1/1934 | Miller | 55/350 X |
| 2,237,684 | 4/1941 | Moore | 55/74 |
| 2,248,225 | 7/1941 | Fonda | 55/179 X |
| 3,274,755 | 9/1966 | Montagnon et al. | 55/59 X |
| 3,762,134 | 10/1973 | St. Cyr et al. | 55/74 X |
| 3,942,960 | 3/1976 | Girard | 55/74 |
| 4,046,525 | 9/1977 | Matsuo et al. | 55/59 |
| 4,047,904 | 9/1977 | Worrall | 55/18 |
| 4,062,777 | 12/1977 | Tsuruta et al. | 55/179 X |
| 4,104,039 | 8/1978 | Kuri et al. | 55/62 X |
| 4,282,015 | 8/1981 | Bartoschek et al. | 55/179 |
| 4,414,003 | 11/1983 | Blaudszun | 55/18 |
| 4,421,532 | 12/1983 | Sacchetti et al. | 55/28 |
| 4,460,466 | 7/1984 | Winter | 55/208 X |
| 4,480,393 | 11/1984 | Flink et al. | 55/62 X |
| 4,689,054 | 8/1987 | Vara et al. | 55/61 |
| 4,737,164 | 4/1988 | Sarkkinen | 55/59 X |
| 4,738,694 | 4/1988 | Godino et al. | 55/59 |

FOREIGN PATENT DOCUMENTS

| | | |
|---|---|---|
| 018478 | 11/1980 | European Pat. Off. . |
| 189041 | 7/1986 | European Pat. Off. . |
| 2553863 | 6/1977 | Fed. Rep. of Germany . |
| 2736109 | 2/1979 | Fed. Rep. of Germany .......... 55/74 |
| 2813691 | 10/1979 | Fed. Rep. of Germany ........ 55/350 |
| 2548040 | 1/1985 | France ................................. 55/179 |
| 22689 | 2/1976 | Japan ................................... 55/74 |
| 69869 | 6/1977 | Japan ................................... 55/62 |
| 1173 | 1/1978 | Japan ................................... 55/62 |
| 140701 | 11/1980 | Japan ................................... 55/179 |
| 10319 | 2/1981 | Japan ................................... 55/208 |
| 168824 | 12/1981 | Japan ................................... 55/74 |
| 167715 | 10/1982 | Japan ................................... 55/387 |
| 90720 | 5/1986 | Japan ................................... 55/74 |
| 164449 | 8/1958 | Sweden .............................. 55/350 |
| 1301101 | 12/1972 | United Kingdom . |
| 1310011 | 3/1973 | United Kingdom . |
| 1459784 | 12/1976 | United Kingdom . |
| 1459785 | 12/1976 | United Kingdom .................. 55/179 |

OTHER PUBLICATIONS

Chemical Engineering, vol. 88, No. 17, Aug. 1981, pp. 63–65, New York, U.S.; "Activated-Carbon Fiber Aids in Solvent Recovery".

Primary Examiner—Robert Spitzer
Attorney, Agent, or Firm—Cushman, Darby & Cushman

[57] ABSTRACT

Method and equipment for recovering solvent from a gaseous waste by adsorption of the solvent on active charcoal in fiber form followed by desorption with a gaseous regenerating fluid which can be hot air or a neutral fluid including nitrogen. The equipment includes one or more adsorption–desorption assemblies containing the active charcoal and a system for recovering the solvent wherein the adsorbed solvent is converted into a vapor, the solvent vapor and any water vapor present is condensed and the condensates are separated. The gaseous regenerating fluid is circulated in a closed circuit through the assembly and the system.

12 Claims, 4 Drawing Sheets

PROCESS AND EQUIPMENT FOR THE TREATMENT AND RECOVERY OF SOLVENT VAPORS BY RECYCLING ON ACTIVE CHARCOAL

The invention relates to a plant and a process for the treatment and recovery of vapours of solvents and more particularly of chlorinated solvents by recycling on active charcoal in fibre form.

The treatment of air originating from various industrial operations and containing solvents and in particular chlorinated solvents by means of active charcoal is known.

The pieces of equipment or plants employed hitherto for recovery of this kind are heavy and their use requires a considerable expenditure of energy. The known plants usually employ active charcoal in granular or spun form, and a disadvantage of these is the formation of an adsorption front which limits the absolute efficiency of the active charcoal.

Recently, plants have appeared employing active charcoal in fibre form, in the form of felts, for the adsorption of the solvents, and superheated steam for the desorption (release of the solvent).

The use of superheated steam for the desorption requires a major expenditure of energy and, furthermore, entails many disadvantages, particularly when chlorinated or chlorofluorocarbon solvents are involved.

In fact, with chlorinated solvents, steam can give rise to highly corrosive hydrochloric acid; moreover, a fraction of this steam remains within the active charcoal; furthermore, the combined action of steam and of elevated temperature completely or partially strips certain chlorinated solvents of their stabilizers, employed to make these chlorinated solvents less corrosive. These stabilizers belong to the class of alcohols, nitroalkanes, epoxides, amines, esters, antioxidants, organic nitrates, nitrites and the like.

As a result, there is a need for equipment permitting the recovery of solvents and in particular of chlorinated solvents, which is less costly to use and which operates at lower temperature, requiring lower expenditure of energy and not destabilizing the chlorinated solvents.

The subject of the invention is consequently an equipment for the treatment of gaseous wastes bearing solvents and more particularly chlorinated solvents, by adsorption on active charcoal in fibre form-preferably in fabric form-followed by desorption employing hot air or a neutral fluid such as nitrogen as regenerating fluid, in order to recover the said solvents in liquid form.

The equipment according to the invention comprises (A) one or more adsorption-desorption element(s) or assembly(ies) containing the active charcoal in fibre form and (B) a system for recovery of the solvents comprising (a) means for converting the adsorbed solvents into vapour form, (b) means for condensing the solvent vapours and the water vapour which may be present originating from the treated gaseous wastes, (c) means for separating, where appropriate, the condensates of different kinds, and (d) means permitting the circulation of the gaseous fluids in a closed circuit through the assembly (A) and the system (B).

The active charcoal in fibre form which is employed is generally in the form of layers or sheets of woven or nonwoven fibres, which are arranged into a bed or mat generally containing from 10 to 30 layers and which is placed between two metal grids held by a metal frame forming a support-frame, one or more of these support-frames being arranged in a square or rectangular drawer in the same single plane formed by a framework consisting of four sides on which angle-pieces supporting the support-frames have been mounted; under the support-frame(s) there are heating elements and, in particular, removable electrical resistors whose ends are fastened onto one of the sides of the framework of the drawer.

The drawers enclosing the support-frames containing the layers of woven or nonwoven fibres of active charcoal are arranged in series and/or in parallel on slides welded onto the framework of the absorption-desorption casing, a baffle which is also welded onto the casing being placed above and below each drawer, a single baffle separating two adjacent drawers.

In a preferred embodiment of the invention, drawers of rectangular shape support two support-frames, each containing from 10 to 30 layers of active charcoal fabric, these drawers being arranged offset relative to one another like a staircase, the drawers being separated by baffles forming chicanes, intended to create turbulence in the circulating fluid, promoting the adsorption and desorption operations.

The casings, the drawers and the support-frames of the adsorber-desorber assembly are made of stainless steel to resist the chlorinated solvents.

The air or the gaseous fluid bearing solvents passes through the layers of active charcoal fabric which adsorb the solvents, the air freed from solvents being discharged into the atmosphere. When the active charcoal in fibre form is saturated with solvents, the regeneration operation enables the adsorbed solvents to be desorbed by a rise in temperature and to be entrained by means of a flow of hot air or neutral gas, and then to be liquefied and recovered, while being separated, where appropriate, from the water which may originate from the moisture present in the treated gaseous waste. The equipment consequently also comprises an oil-bath heater placed in the desorption circuit, which is equipped with a thermostat and is heated to a temperature which is generally between 40° and 50° C., as well as electrical resistors placed below the active charcoal fibres and controlled by another thermostat.

The equipment also comprises means for condensing the solvent vapours; according to an embodiment of the invention, these means comprise a refrigeration unit, a condensation battery, a drop-by-drop system and a separator.

According to another embodiment, the condensation battery and the drop-by-drop system are replaced by a solvent cryocondensation system called "Frigosolver".

A bladed turbine allows the air to circulate in a closed circuit during the desorption operation.

The equipment also comprises air valves or flaps permitting the fluids to be conveyed in an open or closed circuit, a solvent detector placed before the air discharge into the atmosphere, permitting the saturation of the active charcoal fabric to be detected and making it possible to switch over from the adsorption cycle to the desorption cycle when the active charcoal fibres are saturated, avoiding the discharge of solvent into the atmosphere.

The equipment also comprises a suction system placed at the exit of the adsorber such that the assembly is at a slightly reduced pressure, avoiding accidental leakages of the treated gaseous waste.

The equipment also comprises pneumatic, cranked, pointable air valves or shutters, with double action, with interchangeable silicone rubber seals resisting solvents and high temperature and ensuring perfect sealing.

Figure 1:
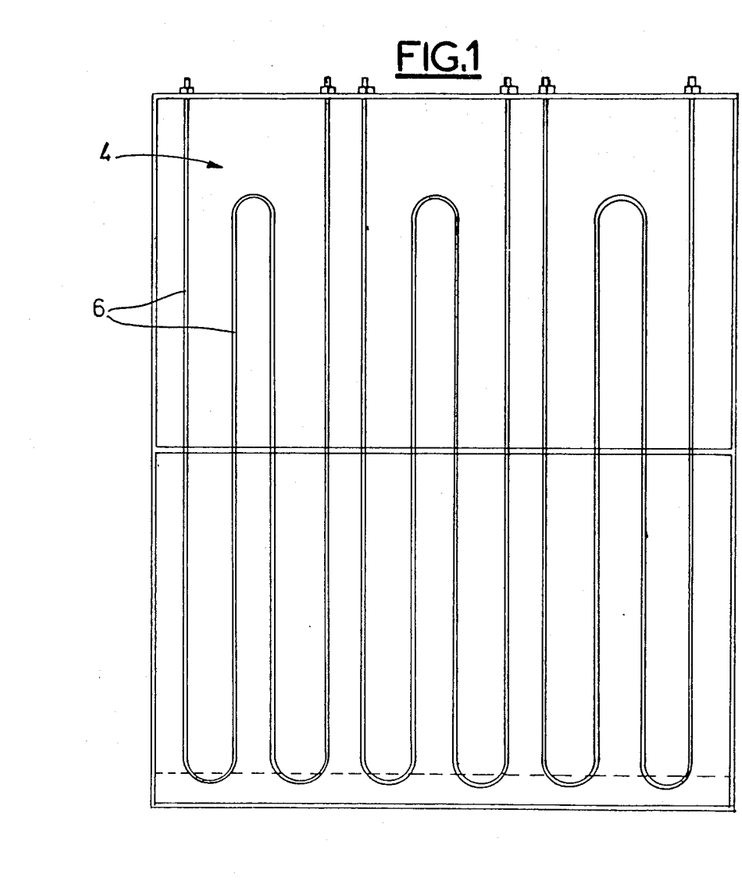
FIG. 1 shows a top view of an interchangeable drawer employed in the adsorber.

FIG. 1 shows a removable drawer (4) with removable electrical resistors (6) the ends of which are fastened onto one of the sides of the framework of the drawer.

Figure 2:
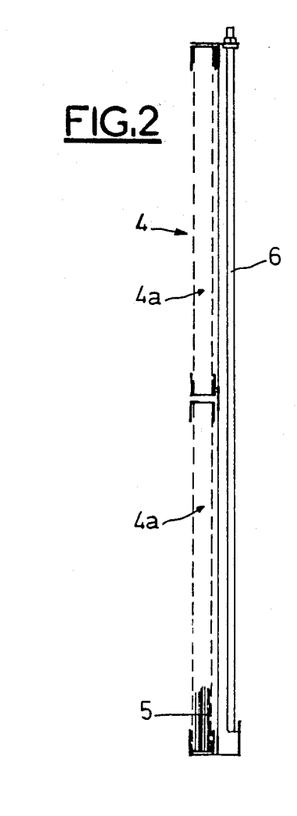
FIG. 2 shows a section of a drawer with support-frames containing the sheets of active charcoal fabric.

FIG. 2 shows the sectional view of a drawer (4) with two support-frames (4a), containing the bed of layers of active charcoal fabric (5); the removable electrical resistor (6) can be seen below the support-frame.

Figure 3:
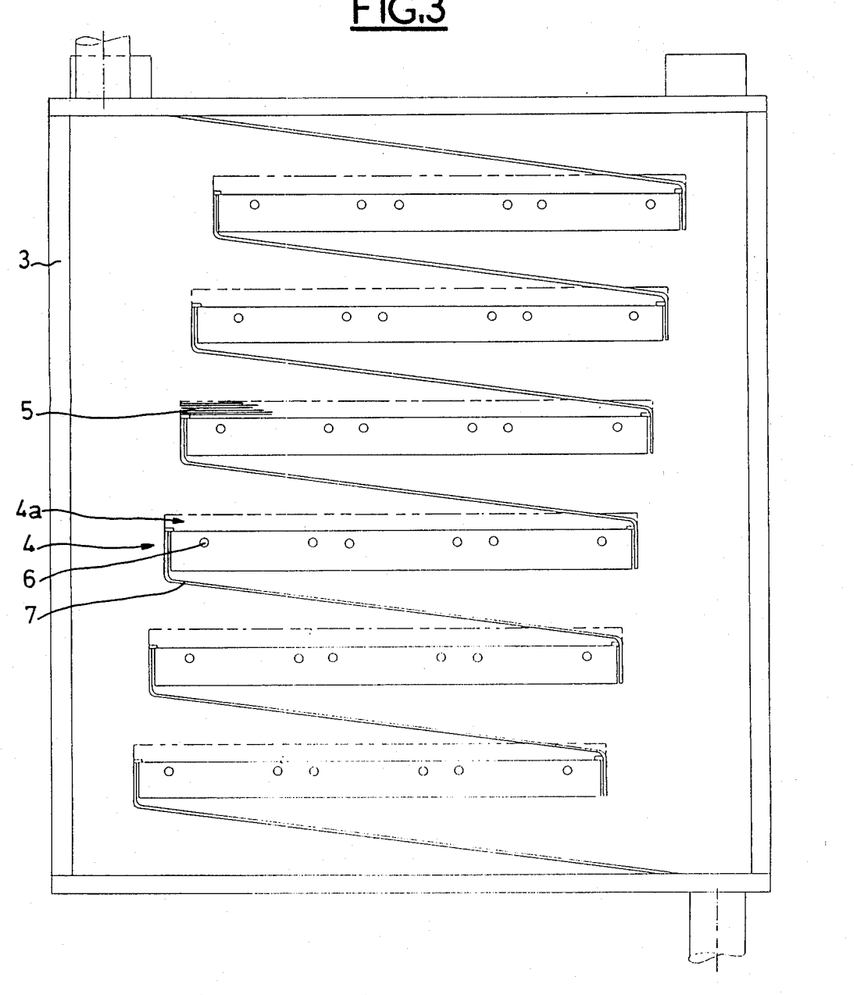
FIG. 3 shows a section of an adsorption-desorption assembly or casing.

FIG. 3 shows the adsorber-desorber assembly containing six removable drawers (4) with the support-frames (4a), the bed of layers of active charcoal fabric (5) and the resistors (6). It can be seen in this figure that the drawers are arranged offset relative to one another and are separated by baffles (7) which prevent air from passing directly from one drawer to another.

Figure 4:
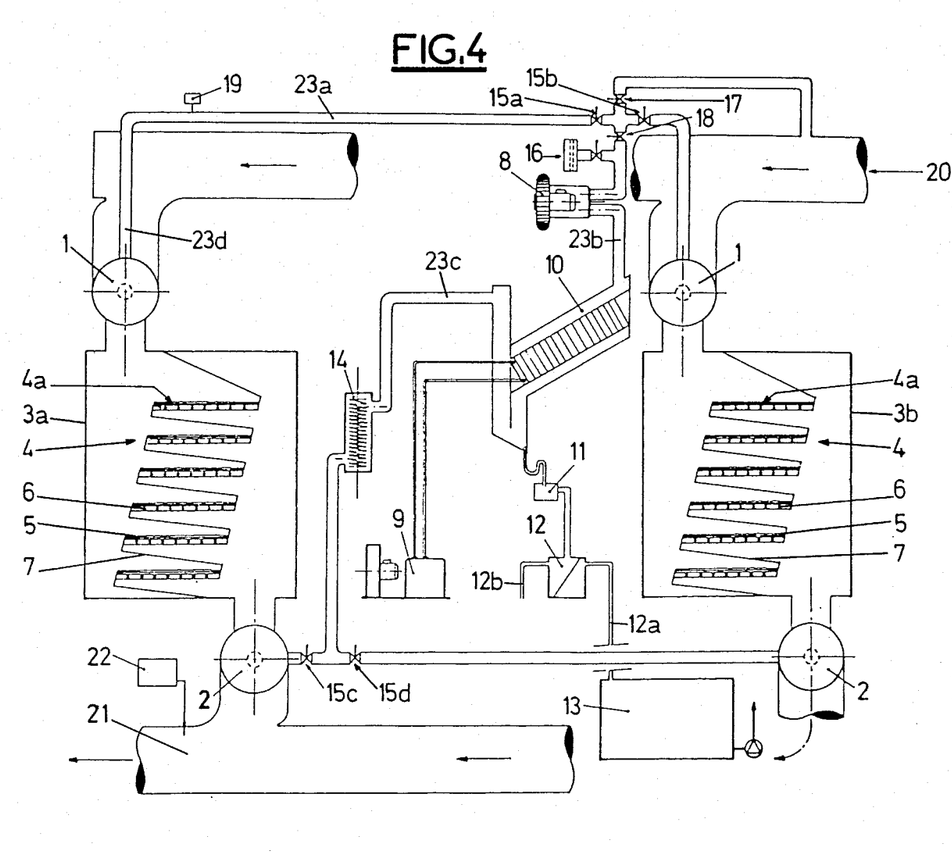
FIG. 4 shows a complete adsorption-desorption plant employing a condensation battery for condensing the solvent vapours.

FIG. 4 shows a complete equipment for the adsorption and for the desorption with liquefaction of the gas vapours by means of a condensation battery (10).

In this figure there can be seen two adsorption-desorption casings or assemblies (3a and 3b) containing seven interchangeable drawers (4) with layers of active charcoal fabric (5) arranged in support-frames (4a) above the resistors (6), the drawers being separated by baffles (7).

The solvent-bearing air arrives via the conduit (20) and the air shutter (1) and passes downwards through the adsorber assembly (3a or 3b). The purified air leaves via the air shutter (2) and the extraction conduit (21). At the exit for the purified air there is a solvent detector (22) allowing the saturation of the active charcoal to be detected. When the active charcoal fabrics are saturated, the detector (22) orders the stoppage of adsorption in the said assembly (3a or 3b) and the beginning of the desorption operation.

The desorption is carried out by means of hot air or of a hot neutral gas such as nitrogen, in a closed circuit. The air shutters (1 and 2) of the adsorber-desorber being regenerated are closed, and the air situated in the assembly being used for adsorption and in the circuit is rotated by a turbine (8). This air is preheated by the oil-bath heater (14) which heats the air generally to a temperature of between 40° and 50° C.; the electrical resistors (6) are heated to a temperature which varies with the nature of the solvent to be recovered so as to produce a temperature of the air passing through the layers of fabric which is sufficient to desorb the solvent.

Assuming that it is the casing (3a) which is undergoing desorption, the air preheated by the heater (14) is directed towards the said casing (3a) via the valve (15c), passes upwards through the drawers bearing the layers of active charcoal fabric, then passes through the conduit (23a), then through the valves (15a and 18), through the conduit (23b), and arrives in the condensation battery (10), where the solvent vapours are condensed, while the moisture which may be present in the air crystallizes in the form of micro-icicles on the condensers. The liquefied solvent flows into a device called a "drop-by-drop system" (11) which comprises a float, a capsule and a constriction calibrated according to the nature of the solvent, the float being linked via a contact switch to a relay which controls the switching off of the heater circuit (14) and the disconnection of the electrical resistors (6) when the drops of solvents become too far apart. From the drop-by-drop system (11), the solvent which entrains the microcrystals of ice reaches the separator (12), which separates the solvent from the water produced by the melting of the microcrystals; the solvent overflows (12a) into a solvent tank (13), while the water is removed via the overflow (12b).

The condensation battery (10) is supplied by a refrigeration unit (9).

When all the condensable quantity of solvent(s) has been condensed and recovered, filtered fresh air enters via the air valve (16). This fresh air follows the desorption path indicated above. Since the heater (14) and the electrical resistors (6) are switched off, the active charcoal fibres (5) are cooled.

The last remainders of solvent extracted from the cooled active charcoal are directed, via the air valve (17) into the conduit (20) and are adsorbed by the active charcoal fabrics situated in the second assembly (3b) which is being used for adsorption.

The desorption operation comprises a number of recycling cycles. During the recycling, the hot air or inert gas bearing solvent vapours flows through a circuit comprising the conduits (23a, 23b), the condensation battery (10), the conduit (23c), the heater (14), the valve (15c), the assembly (3a) and the conduit (23d). A similar circuit is established for the adsorption of the assembly (3b).

Figure 5:
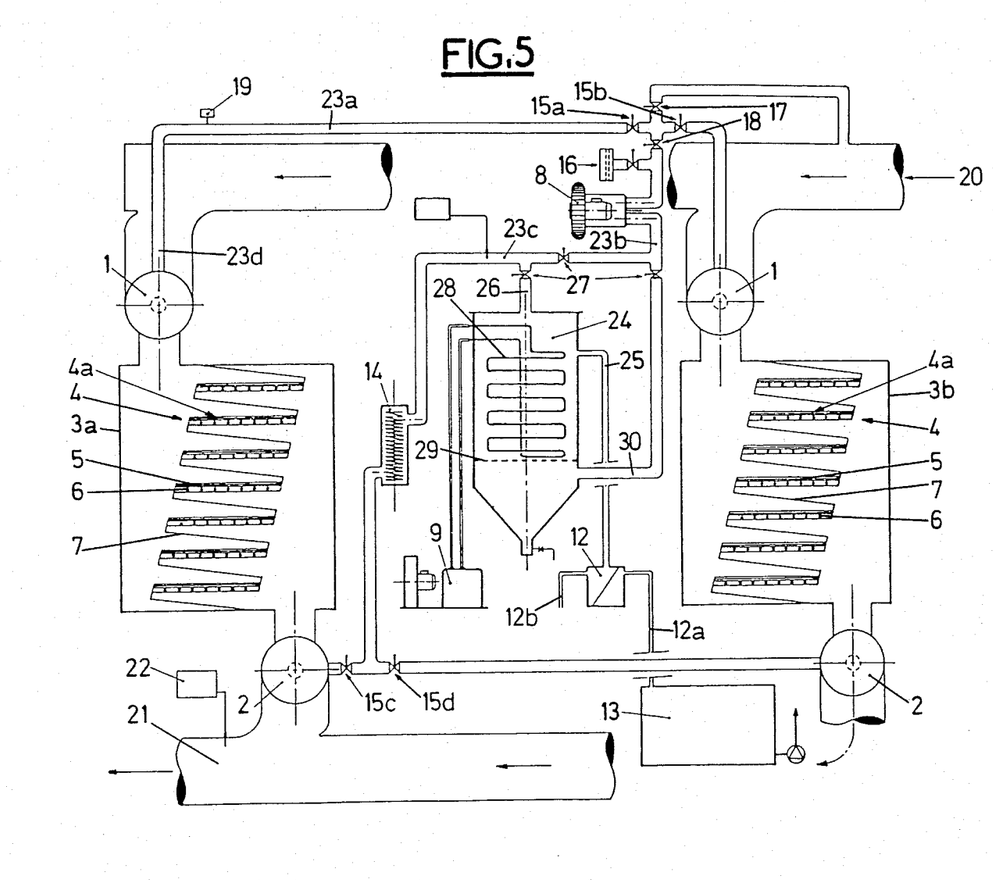
FIG. 5 shows a complete adsorption-desorption plant employing a recovery system called 'Frigosolver' for condensing the solvent vapours.

FIG. 5 shows the same equipment as FIG. 4, with the difference that the condensation battery (10) is replaced with a cryocondensation device for solvent recovery, called "Frigosolver" (24). The "Frigosolver" system comprises a cylindroconical receptacle filled with solvent of the same nature as the solvent to be recovered and placed at a temperature of −10° to −15° C. The air bubbles containing the solvent and possibly water vapour originating from the moisture in the treated gaseous wastes arrive at the lower part of this receptacle via the conduit (30) and are dispersed into the refrigerated solvent by means of a diffuser (29). The solvent vapours are liquefied while any moisture which may be present is crystallized in the form of micro-icicles. The liquid solvent containing the crystals of ice in suspension passes via the overflow (25) into a separator (12) which separates off the solvent which passes via the overflow (12a) into the solvent tank (13), while the water produced by the melting of the microcrystals of ice leaves via the overflow (12b); the cold air leaves through the upper part via the conduit (26) and continues its cycle, passing again through the heater (14).

When there are no more solvents to be liquefied, the cooling of the fabric takes place, the "Frigosolver" assembly being isolated by means of the air valves (27).

The purge using filtered fresh air entering via the valve and the filter (16) entrains the last remainders of solvent towards the conduit (20), via the valve (17) and is carried out in the same way as when the condensation battery according to FIG. (4) is employed.

The equipment according to the invention has the following advantages compared to the plants of the prior art:
- a large area of access to the active charcoal;
- a practically nil adsorption front and very fast adsorption kinetics, which make it possible:
- to reduce markedly the weight of active charcoal employed;
- employ very short adsorption-desorption cycles, leading to a corresponding reduction in the volume of the industrial equipment;
- a very low pressure drop through the active charcoal fabric layer;
- a possibility of easy changing of the support-frames containing the bed of layers of active charcoal fabric;
- a lightweight adsorption-desorption assembly, consequently employing a reduced quantity of stainless steel;
- an offset arrangement of the drawers and the arrangement of the baffles creating a turbulence which promotes the distribution and the circulation of the gas streams during adsorption and desorption;
- during the desorption, the heating in the vicinity of the bed of active charcoal fabric, by means of electrical resistors, without the need to heat the whole volume of circulating air to the same temperature, enables much energy to be saved;
- the use, for the desorption, of hot air or of a hot neutral gas such as nitrogen instead of the steam which is usually employed, reduces corrosion and avoids the destabilization of chlorinated solvents;
- switching off the heating using the drop-by-drop system makes it possible to switch over automatically from desorption to cooling by purging with fresh air;
- at the end of the desorption, the return of the last remainders of solvent into the casing (3) operating on adsorption avoids the discharge of these solvent residues into the atmosphere;
- the presence of a motor-driven suction fan at the exit of the conduit (21) for the air from the adsorber keeps the assembly at a slightly reduced pressure and prevents possible leakages;
- table demountable drawers (4), the support-frames (4a) (containing layers of active charcoal fabric) and the interchangeable electrical resistors (6) considerably facilitate maintenance operations; and
- the design of the pneumatic air shutters provided with interchangeable seals ensures perfect sealing.

A further subject of the invention is an equipment for the treatment of solvent-bearing gaseous waste, by adsorption on active charcoal in fibre form, preferably in the form of fabric, followed by a desorption, by means of regeneration fluids, and of a solvent recovery, characterized in that it comprises (A) one or more, and preferably two, adsorption-desorption assemblies or casings (3) containing the active charcoal in fibre form, preferably in the form of fabric and (B) a system for recovering the solvents comprising:

(a) means for converting the adsorbed solvents into vapour form;
(b) means for condensing the solvent vapours and the water vapour which may be present;
(c) means for separating, if appropriate, the condensed solvents from ice crystals originating from the water vapour present in the regeneration fluid; and
(d) means permitting the circulation of the fluids in a closed circuit through the assembly (A) and the system (B).

The adsorption-desorption assembly (3) contains active charcoal in fibre form, preferably in the form of a bed consisting of superposed layers of active charcoal fabric, which are arranged between two metal grids and held by a metal frame, forming a support-frame (4a), one or more of these support-frames being arranged in a square or rectangular drawer (4) formed by a framework consisting of four sides on which angle-pieces supporting support-frames have been mounted; under the support-frame(s) there are heating elements, in particular removable electrical resistors (6) the ends of which are fastened onto one of the sides of the framework.

The drawers enclosing the support-frames containing the layers of active charcoal fabric are arranged in series or in parallel on slides welded onto the framework of the casing (3), a baffle (7), also welded onto the casing, being placed above and below each drawer (4), a single baffle separating two adjacent drawers.

These baffles welded onto the walls ensure that the casings are stronger and make it possible to reduce the thickness of the stainless steel sheeting of the casings, and this reduces the cost of the equipment.

The adsorption-desorption assembly (3) comprises a number of drawers (4), preferably between six and ten in series, these demountable drawers being fitted with support-frame(s) containing the bed of active charcoal fabric, these drawers, being arranged offset relative to one another and baffles (7), forming chicanes, give rise to turbulence in the circulating fluid, promoting the distribution and the circulation of the gas streams during adsorption and desorption.

As means for desorbing the solvents adsorbed onto the active charcoal, the equipment comprises:
- a heater, for example incorporating an oil-bath (14);
- heating elements such as heating resistors (6) placed below the support-frames containing the bed of layers of active charcoal fabric; and
- a thermostat (19) which controls the heating resistors, and a thermostat which controls the oil-bath heater (14).

According to one of the embodiments, the means for condensing the solvent vapours comprise a refrigeration unit (9), a condensation battery (10), a drop-by-drop system (11), and a separator (12).

According to another embodiment, the condensation battery (10) and the drop-by-drop system (11) are replaced by a cryocondensation device for solvent recovery, containing an identical refrigerated solvent, called "Frigosolver" (24).

According to an embodiment, the means for condensing the solvent vapours comprise a refrigeration unit and a cryocondensation device which separate off the condensable products entrained by the gaseous regeneration fluid. These products are condensed in liquid form in the case of the solvent and in the form of ice crystals in the case of any water which may be present in the solvent. The cryocondensation device consists either of a cold-wall condenser, or of a refrigerated mass of solvent of the same kind as the solvent to be condensed and into which the gaseous regeneration fluid is bubbled.

The equipment also comprises a bladed turbine (8) and valves (15a, 15b, 15c, 15d and 27) making it possible to recycle in a closed circuit the gaseous fluids present in the assembly (3) which is under desorption and in the recycling circuit and enabling them to be passed through the conduits (23) in a closed circuit, since the said turbine (8) withstands high concentrations of solvent vapour.

The valves or shutters (17) make it possible to return the air leaving the assembly (3) which is under desorption and which contains noncondensable vapours in residual quantity into the assembly (3), which is under adsorption, thus making it possible to avoid the discharge of the residual solvents into the atmosphere.

The solvent detector (22) placed before the air discharge into the atmosphere makes it possible to detect the saturation of the active charcoal fabric and to switch over from the adsorption cycle to the desorption cycle, avoiding the emission of solvent into the atmosphere.

The suction system placed at the exit of the adsorber places the assembly under slightly reduced pressure, avoiding accidental leakages of the treated gaseous waste.

Another subject of the invention is a process for the treatment and recovery of solvent vapours present in air or in another gaseous fluid, characterized in that the air or the gaseous fluid containing the solvent vapours is treated in an equipment according to the invention, this process comprising three stages.

In a first adsorption stage, the air or the gaseous fluid containing the solvent vapours are passed, at ambient temperature, through the adsorber (3) containing superposed layers of active charcoal fabric (5) forming a bed, in a support-frame (4a) arranged in a removable drawer (4) above heating elements, in particular removable electrical resistors (6); the solvent vapours are adsorbed onto the active charcoal fabric and the air or the gaseous fluid freed of solvent is discharged via a conduit (21) provided with a fan which maintains the assembly at a slightly reduced pressure;

in a second desorption stage, a gaseous regeneration fluid, and preferably air or a neutral gas such as nitrogen is recycled by means of a turbine (8) in a closed circuit, through the solvent-impregnated layers of active charcoal fabric (5), the said active charcoal fabrics being heated by electrical resistors (6) placed below the layers of active charcoal fabric, the regeneration fluid being preferably chosen from air and nitrogen preheated by an oil-bath heater (14); the solvent adsorbed onto the active charcoal fabric, vaporized by the heat, flows through the conduit (23a), the valves (15a), (18), the conduit (23b), is liquified in the condensation battery (10) (cooled by a refrigeration unit (9)), the liquid solvent then flows through the drop-by-drop system (11) into the separator (12) and then via the overflow (12a) into the solvent tank (13); the water vapour which may be present in the regeneration fluid is deposited on the condensers of the condensation battery (10) in the form of ice crystals which are entrained by the liquid solvent into the separator (12) which separates them from the solvent and the liquid water leaves via the overflow (12b); the recycling being continued until all the condensable quantity of solvent has been condensed;

the temperature of regeneration of active charcoal fabric is generally from 10° to 30° C., and preferably approximately 15° C. higher than the boiling temperature of the solvent to be recovered;

in a third purging stage, the heating of the resistors (6) and of the heater (14) is switched off and the active charcoal fabrics (5) are cooled by purging with air or with a fresh neutral gas such as nitrogen, which follows the same path as during the desorption stage.

Another subject of the invention is an alternative form of the process for the treatment of recovery of solvent vapours; this alternative form, illustrated by FIG. 5, is characterized in that the condensation battery and the drop-by-drop system (11) (which are shown in FIG. 4) are replaced by the assembly of the cryocondensation system for the recovery of solvents called "Frigosolver" (24) (shown in FIG. 5). In this alternative form, the solvent vaporized by the heat is delivered into the "Frigosolver" system, which contains solvent of the same kind as that to be recovered, refrigerated to between −10° and −15° C. by means of condensers (28) connected to a refrigeration unit (9), arriving at the lower cylindrical part of the "Frigosolver" system via the conduit (30) are diffused into the refrigerated solvent by the diffuser (29) which ensures a homogeneous distribution of the flow of solvent vapour, and are condensed while the moisture present in the vapour is crystallized in the form of micro-icicles which are entrained by the solvent and both pass via the overflow (25) into the separator (12) which separates the solvent removed via the conduit (12a) from the water removed via the conduit (12b), the cold air leaving in the upper part of the "Frigosolver" via the conduit (26);

in a third purging stage, the heating of the resistors (6) and of the heater (14) is switched off and fresh air or a fresh neutral gas is circulated through the active charcoal fabrics, the "Frigosolver" system being isolated by the air valves (27).

In the process according to the invention, the same assembly (3a) and (3b) containing the active charcoal fabric is used alternatively for the adsorption and for the desorption; preferably, two adsorption-desorption assemblies (3a and 3b) are employed, and operate alternately, one under adsorption, the other under desorption.

The residual quantities of solvents which are extracted from the active charcoal at the end of the desorption stage are conveyed via the air valve (17) into the conduit (20) and from there into the assembly (3) which operates under adsorption, and are adsorbed by the active charcoal fabric.

The duration of the desorption stage is shorter than that of adsorption. The desorption operation preferably takes between 4 and 6 minutes, the operation of purging with air or with a fresh neutral gas takes approximately one minute and an interval of 30 to 60 seconds separates the purge from a new adsorption cycle, as a safety measure.

The process according to the invention permits the recovery of all kinds of solvents and applies preferably to chlorinated solvents such as methylene chloride, 1,1,1-trichloroethane (called trichloroethane 111), trichloroethylene and perchloroethylene, and to chlorofluorocarbon solvents.

Among the chlorofluorocarbon solvents there may be mentioned more particularly chlorodifluoromethane, dichlorodifluoromethane, trichlorofluoromethane and 1,1,1-trichloro-2,2,2-trifluoroethane.

The active charcoal fabric employed is chosen from the group consisting of woven fabrics, nonwoven felts and knits. An active charcoal fabric made up of woven fibres is preferably employed.

The active charcoal fibres in the form of fabric are manufactured from various fabrics, preferably from viscose fabrics or synthetic fabrics.

A roll of fabric is continuously unwound at the feed of the carbonization and activation furnace. The carbonization is carried out at an intermediate temperature of up to 600° C. in order to remove by combustion all the compounds other than carbon. The objective of an activation at a higher temperature which is generally between 600° and 1000° C. is to create the porosity of the active charcoal and to endow it with adsorption properties. This process of manufacture employs a range of temperatures and of residence times, and auxiliary products, which make it possible to retain the original structure of the fibre and of the fabric. The active charcoal fabric obtained can thus be rewound again. The more detailed process for the manufacture of active charcoal fabric is described in British Pat. Nos. 1,301,101 and 1,310,011.

Advantageously, use is made of active charcoal fabric produced by the company Charcoal Cloth Ltd, which produces bands of fabric which have a width of between 2.5 cm and 90 cm.

The active charcoal fabric employed according to the invention is microporous, 90% of the porosity being created by pores which have a mean diameter below 20 Å ($2 \times 10^{-9}$m). The thickness of a layer of fabric is 0.5 mm.

The weight per square metre ranges from 100 to 120 g/m$^2$, the benzene index (number of grams of benzene absorbed per 100 g of active charcoal) varies from 25 to 50, depending on the grades, the BET surface area in m$^2$/g varies from 1000 to 1400.

The pressure drop through the active charcoal fabric is very low and represents 0.1 mm of column of water per layer of 0.5 mm thickness for a flow velocity of 1 cm/second.

The total pressure drop is markedly lower than that of a bed of active charcoal granules having the same adsorption capacity.

The nonlimiting Example below illustrates the invention.

EXAMPLE

The treatment of air containing 1,1,1-trichloroethance (called trichloroethane 111) at a concentration of 20 g/m$^3$ is carried out by means of the equipment shown in FIG. 4.

The flow velocity is set at 10 cm/second. The solvent-bearing air flows through a bed of active charcoal consisting of twenty layers of Charcoal Cloth Ltd active charcoal fabric, FM1/250 grade, which has a weight of 110 g/m$^2$, a benzene index of 32%, a BET surface area of 1250 g/m$^2$ and a Langmuir surface area of 1450 m$^2$/g.

The adsorption is stopped when the content of trichloroethane 111 discharged into the air is 110 ppm. The duration of the adsorption cycle is 7 minutes.

The desorption of trichloroethane 111 is carried out by regeneration with hot air. The temperature of the air leaving the oil-bath preheater is 55° C., the power of the electrical resistors, expressed in watts/m$^2$ of drawer area is 4500 watts/m$^2$. The temperature of air delivered to the active charcoal fabric is 140° C., and after having passed through the bed of active charcoal fabric, its temperature drops to 80° C. It may be considered that the mean temperature of the bed of active charcoal fabric is approximately 120° C.

The desorption time is 5 minutes and the degree of adsorption is 25%.

We claim:

1. A process for the treatment and recovery of solvent vapors contained in air or in another gaseous fluid, wherein the air or the gaseous fluid containing the solvent vapors is treated in an equipment comprising:
   (A) one or more adsorption-desorption assemblies or casings (3) containing active charcoal in fiber form in the form of a bed (5) made up of superposed layers of active charcoal fibers, said bed being arranged between two metal grids held by a metal frame, forming a support-frame (4a) containing said active charcoal fibers, one or more of said support-frame(s) being arranged in a square or rectangular drawer (4) formed by a frame-work supporting the support-frames containing said bed of layers of active charcoal fibers, said support-frames being provided with removable electrical resistors (6) the ends of which are fastened onto one of the sides of the framework; and
   (B) a system for recovering the solvents comprising:
      (a) means for converting the adsorbed solvents into vapor form;
      (b) means for condensing the solvent vapors and, if present, water vapor;
      (c) means for separating the condensed solvents from the water originating from the water vapor present in the gaseous discharge to be treated; and
      (d) means comprising conduits, air shutters and valves so as to permit circulation of the fluid in a closed circuit through assembly (A) and system (B),
   said process comprising three stages,
      (1) in a first adsorption stage, passing air or the gaseous fluid containing the solvent vapors at ambient temperature through the adsorber (3) containing superposed layers of active charcoal fibers (5) forming a bed, in a support-frame (4a) arranged in a removable drawer (4) above removable electrical resistors (6); adsorbing said solvent vapors onto said active charcoal fibers and discharging the air or the gaseous fluid freed of solvent;
      (2) in a second desorption stage recycling the gaseous regeneration fluid by means of a turbine (8) in a closed circuit, through the layers of solvent-impregnated active charcoal fibers (5), the said active charcoal fibers being heated by heating elements (6) placed below the layers of active charcoal fibers, said regeneration fluid being heated by a heater (14), the solvent adsorbed onto the active charcoal fibers being vaporized by heat and then being liquefied in a cryocondensation device cooled by a refrigeration unit (9), while any water vapor present in the regeneration fluid is separated off in the form of ice crystals; and
      (3) in a third purging stage, switching off the heating of resistors (6) and heater (14) and cooling the active charcoal (5) by purging with air or with the fresh neutral gas which follows the same path as during the desorption stage.

2. The process of claim 1, wherein air is used as a gaseous regeneration fluid.

3. The process of claim 1 wherein nitrogen is used as a gaseous regeneration fluid.

4. The process of claim 1, wherein during desorption the temperature of the bed of active charcoal fibers is generally from 10° to 30° C. higher than the boiling temperature of the solvent to be recovered.

5. The process of claim 1, wherein (i) a chlorinated solvent chosen from the group consisting of methylene chloride, trichloroethane, trichloroethylene and perchloroethylene or (ii) a chlorofluorocarbon solvent is recovered.

6. The process of claim 1, wherein the active charcoal fibers employed have a benzene index (number of grams of benzene adsorbed per 100 g of active charcoal fibers) of between 25 and 50, and a BET surface area in $m^2/g$ of between approximately 1000 and 1400.

7. Equipment for the treatment of solvent-bearing gaseous wastes, by adsorption on active charcoal in fiber form followed by desorption by means of a gaseous regeneration fluid, comprising
(A) one or more adsorption-desorption assemblies or casings (3) containing the active charcoal in fiber form in the form of a bed (5) made up of superposed layers of active charcoal fibers, said bed being arranged between two metal grids held by a metal frame, forming a support-frame (4a) containing said active charcoal fibers, one or more of said support-frame(s) being arranged in a square or rectangular drawer (4) formed by a frame-work supporting said support-frames containing said bed of layers of active charcoal fibers, said support-frames being provided with removable electrical resistors (6), the ends of which are fastened onto one of the sides of said framework; and
(B) a system for recovering the solvents comprising:
  (a) means for converting the adsorbed solvents into vapor form;
  (b) means for condensing solvent vapors and, if present, water vapors;
  (c) means for separating the condensed solvents from the water originating from the water vapor present in the gaseous discharge to be treated; and
  (d) means comprising conduits, air shutters and valves so as to permit circulation of the fluid in a closed circuit through assembly (A) and system (B).

8. Equipment according to claim 7, wherein said drawers enclosing the support-frames containing the layers of active charcoal fibers are arranged in series on slides welded onto the framework of the adsorption-desorption casing, a baffle (7) also welded onto the casing, being placed above and below each drawer (4) with only one baffle separating two adjacent drawers.

9. Equipment according to claim 7, wherein the adsorption-desorption assembly or casing (3) comprises a number of demountable drawers (4) fitted with a bed (5) of active charcoal fibers, said drawers being arranged offset relative to one another, and said drawers being separated by baffles (7) forming chicanes, so as to produce turbulence in the circulating fluid, and to promote the distribution and the circulation of the fluid during adsorption and desorption.

10. Equipment according to claim 7 wherein said means for converting the adsorbed solvents into vapor form comprise:
a heater for said regeneration fluid,
heating elements placed below said support-frames containing said bed of layers of active charcoal fibers, and
a thermostat which controls said heating elements and a thermostat which controls said heater for said regeneration fluid.

11. Equipment according to claim 7, wherein said means for condensing the solvent vapors and separating the condensed solvents from the water vapor present, comprises
(i) a refrigeration unit (9),
(ii) a cold-wall condenser which separates off the condensable products entrained by the gaseous regeneration fluid, said products being condensed in liquid form in the case of the solvent and in the form of ice crystals in the case of water present in the solvent,
(iii) a drop-by-drop system comprising a float, a capsule and a constriction calibrated according to the nature of the solvent, said float being linked via a contact switch to a relay, and
(iv) a separator which separates the solvent from the water by overflow.

12. Equipment according to claim 7, wherein said means for condensing the solvent vapors and separating the condensed solvents from the water vapor present, comprises
(i) a refrigeration unit (9), and
(ii) a cryocondensation device consisting of a refrigerated mass of solvent of the same kind as the solvent to be condensed and into which the gaseous regeneration fluid is bubbled.

* * * * *